US009061564B1

(12) United States Patent
Yu et al.

(10) Patent No.: US 9,061,564 B1
(45) Date of Patent: Jun. 23, 2015

(54) ACTIVE VEHICLE WITH A VARIABLE INCLINATION APPARATUS AND METHOD OF USING THE SAME

(71) Applicant: Automotive Research & Testing Center, Changhua County (TW)

(72) Inventors: Chao-Chih Yu, Changhua County (TW); Chih-Jung Yeh, Changhua County (TW); Jin-Yan Hsu, Changhua County (TW); Jiun-Jie Chen, Changhua County (TW); Shih-Jung Ho, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 0 days.

(21) Appl. No.: 14/109,965

(22) Filed: Dec. 18, 2013

(51) Int. Cl.
*B60G 21/00* (2006.01)
*B60G 17/00* (2006.01)
*B62D 9/04* (2006.01)
*B60G 21/05* (2006.01)
*B60G 17/016* (2006.01)

(52) U.S. Cl.
CPC .............. *B60G 21/007* (2013.01); *B60G 17/00* (2013.01); *B62D 9/04* (2013.01); *B60G 21/05* (2013.01); *B60G 17/0162* (2013.01); *B60G 2202/422* (2013.01)

(58) Field of Classification Search
CPC .. B60G 17/0162; B60G 21/007; B60G 21/05; B60G 2202/422; B62D 9/04
See application file for complete search history.

(56) References Cited

U.S. PATENT DOCUMENTS

| | | | | | |
|---|---|---|---|---|---|
| 2,261,821 | A | * | 11/1941 | Altemus | 280/5.521 |
| 2,787,473 | A | * | 4/1957 | Chiodo | 280/5.501 |
| 4,484,648 | A | * | 11/1984 | Jephcott | 180/210 |
| 4,796,720 | A | * | 1/1989 | Bauer | 180/234 |
| 4,998,596 | A | * | 3/1991 | Miksitz | 180/213 |
| 5,630,623 | A | * | 5/1997 | Ganzel | 280/124.106 |
| 5,927,424 | A | * | 7/1999 | Van Den Brink et al. | 180/216 |
| 6,170,838 | B1 | * | 1/2001 | Laurent et al. | 280/5.508 |
| 6,328,125 | B1 | * | 12/2001 | Van Den Brink et al. | 180/211 |
| 6,517,089 | B2 | * | 2/2003 | Phillis et al. | 280/6.157 |
| 6,793,228 | B2 | * | 9/2004 | Zadok | 280/124.134 |

(Continued)

FOREIGN PATENT DOCUMENTS

| | | |
|---|---|---|
| CN | 101282871 A | 10/2008 |
| CN | 103038126 A | 4/2013 |

(Continued)

*Primary Examiner* — Nicole Verley
(74) *Attorney, Agent, or Firm* — CKC & Partners Co., Ltd.

(57) ABSTRACT

An active vehicle with variable inclination mechanism is provided. The active vehicle with variable inclination mechanism comprises a linear slide mechanism, two sets of longitudinal interlocking mechanism, a steering control mechanism, and a control unit. The linear slide mechanism comprises a reciprocating action member. A lateral displacement of the reciprocating action member drives the longitudinal interlocking mechanism to produce a displacement along a longitudinal direction while a torque is applied at the steering control mechanism. The wheels are driven to move along an opposite longitudinal direction and to form an inclination. Using the active vehicle with variable inclination mechanism can provide a real-time inclination force while rounding a corner as well as increase the safety. Besides, the driver can easily get on/off the vehicle when the vehicle is stationary and the reciprocating action member is locked at the stationary position of the vehicle.

11 Claims, 11 Drawing Sheets

(56) References Cited

U.S. PATENT DOCUMENTS

| | | | |
|---|---|---|---|
| 7,090,234 B2 * | 8/2006 | Takayanagi et al. ... | 280/124.103 |
| 7,210,544 B2 * | 5/2007 | Kamen et al. ............ | 180/7.1 |
| 7,234,708 B2 * | 6/2007 | Blondelet et al. ......... | 280/5.521 |
| 7,311,167 B2 * | 12/2007 | Takayanagi et al. ....... | 180/215 |
| 7,377,522 B2 * | 5/2008 | MacIsaac .................. | 280/5.507 |
| 7,401,794 B2 | 7/2008 | Laurent et al. | |
| 7,647,999 B2 | 1/2010 | Geiser | |
| 7,954,827 B2 * | 6/2011 | Maruyama et al. ....... | 280/5.522 |
| 8,050,820 B2 * | 11/2011 | Yanaka et al. ............ | 701/37 |
| 8,123,240 B2 * | 2/2012 | Mercier ................... | 280/124.103 |
| 8,515,620 B2 * | 8/2013 | Ketteler et al. ........... | 701/39 |
| 8,641,064 B2 * | 2/2014 | Krajekian ................. | 280/124.103 |
| 8,781,684 B2 * | 7/2014 | Bruce ....................... | 701/41 |
| 8,813,898 B2 * | 8/2014 | Wagner .................... | 180/282 |
| 2003/0000765 A1 * | 1/2003 | Spadafora ................. | 180/422 |
| 2011/0275256 A1 * | 11/2011 | Gibbs et al. .............. | 440/12.51 |
| 2014/0239603 A1 * | 8/2014 | Balandin .................. | 280/5.521 |

FOREIGN PATENT DOCUMENTS

| | | | | |
|---|---|---|---|---|
| DE | 102005037973 A1 * | 2/2007 | ............ | B60G 7/00 |
| DE | 102007060876 A1 * | 7/2008 | ............ | B60G 17/015 |
| EP | 1281541 A1 * | 2/2003 | ............ | B60G 21/055 |
| EP | 2199122 A1 * | 6/2010 | ............ | B60G 21/00 |
| TW | 200815232 | 4/2008 | | |
| TW | 201118003 | 6/2011 | | |
| WO | WO 2007119917 A1 * | 10/2007 | | |

* cited by examiner

ACTIVE VEHICLE WITH A VARIABLE INCLINATION APPARATUS AND METHOD OF USING THE SAME

BACKGROUND

1. Field of Invention

The present invention relates to an active vehicle with variable inclination mechanism and the method using the same. More particularly, the present invention relates to an active vehicle of a variable inclination mechanism that drives lateral movement by turning direction and drives two wheels to produce a opposite longitudinal displacement so as to change inclination.

2. Description of Related Art

Widely used active vehicles are two-wheeled vehicle, three-wheeled vehicle or even four-wheeled vehicle. The two-wheeled vehicles are bicycles and motorcycles. Compared to the three-wheeled vehicle or four-wheeled vehicle, the two-wheeled vehicles have more maneuverability, and oil consumption, vehicle volume and price are much lower.

The two-wheeled vehicle just has a front wheel and a rear wheel, while the two-wheeled vehicle is stationary, it should be supported by kickstand or the rider him/herself. Its not convenient for disabled riders.

Thus, to overcome aforementioned shortcoming, three-wheeled vehicles have been developed. Compared to the three-wheeled vehicles, the three-wheeled vehicles have much seat space and riding comfort, and the three-wheeled vehicles have self-supported capability while three-wheeled vehicles are stationary. Because the three-wheeled vehicles have three wheels, two of three wheels are disposed parallel and a triangle is defined by the three wheels. Thus, while the three-wheeled vehicles are stationary, the three-wheeled vehicles have self-supported capability at flat ground without external forces.

However, the three-wheeled vehicles in prior art have no mechanism for "leaning" while the three-wheeled vehicles enter the curve. Thus, whatever the three-wheeled vehicles have two parallel wheels in front of or behind of the vehicles, unlike the two-wheeled vehicle, the three-wheeled vehicles in prior art cannot provide inclination force by leaning in entry of curve so that the three-wheeled vehicles easily turn over.

To overcome this shortcoming, the three-wheeled vehicles in prior art have a leaning mechanism or suspension system with a linkage system at the two parallel wheels so as to have "leaning" capability based on weight and center of mass of vehicles. However, the leaning mechanism or suspension system should be operated by the driver's weight because a moment of force due to the driver's weight pushes the vehicle to lean. Thus, leaning mechanism or suspension system of the three-wheeled vehicles in prior art merely passively provide vehicles with "leaning" capability.

Furthermore, the leaning mechanism or suspension system of the three-wheeled vehicles in prior art operate independently, and cannot provide two wheels with real-time and synchronous change of leaning angle and cannot make sure whether the vehicles can safely enter and leave the curve.

Moreover, although the three-wheeled vehicles in prior art unlike two-wheeled vehicles needs additional kickstand while the three-wheeled vehicles are stationary, riders should use their legs to balance the vehicles before manually locking the leaning mechanism or suspension system to support the vehicles. It is not convenient for rider to support vehicles while in stationary.

For the forgoing reasons, there is a need for active vehicle with a variable inclination apparatus to provide sufficient inclination vehicle while the vehicle passes the curve with more riding safety.

SUMMARY

In summary, the present invention provides an active vehicle with variable inclination mechanism. The active vehicle with variable inclination mechanism includes a linear slide mechanism, a steering control mechanism, a control unit, and a longitudinal interlocking mechanism. The rider turns the steering control mechanism to control inclination change of the vehicles so as to provide real-time inclination force while the three-wheeled or four wheeled vehicles pass a corner and increase riding safety.

According to one embodiment, the present invention provides an active vehicle with variable inclination mechanism that is used to change inclination angle of vehicle with three or more wheels. The active vehicle with variable inclination mechanism includes a linear slide mechanism, two longitudinal interlocking mechanism, a steering control mechanism, a control unit, and two wheels. The linear slide mechanism includes a reciprocating action member, and the control unit controls the reciprocating action member to produce a lateral displacement.

The two longitudinal interlocking mechanisms include a plurality of interlocking rods, and two ends of the reciprocating action member are connected to two longitudinal interlocking mechanism respectively. The other ends of the two longitudinal interlocking mechanisms are connected to two wheels of the vehicle respectively. The steering control mechanism is electrically connected to the control unit, and the control unit generates an electrical signal by turning the steering control mechanism so that the reciprocating action member of the linear slide mechanism is driven to produce a lateral displacement. The interlocking rods of the two longitudinal interlocking mechanisms are driven simultaneously by the lateral displacement, so that two wheels of the vehicles have an opposite longitudinal displacement to provide the vehicle with an inclination.

According to one embodiment of the present invention, the linear slide mechanism is a linear motor, and the reciprocating action member is a mover of the linear motor.

According to one embodiment of the present invention, the linear slide mechanism is a motor and a ball nut, and the reciprocating action member is a ball screw.

According to another embodiment of the present invention, the linear slide mechanism includes a motor and a pinion gear, and the reciprocating action member includes a rack gear.

According to one embodiment of the present invention, while a torque is applied to the steering control mechanism, the control unit generates an electrical signal to the linear slide mechanism and controls the reciprocating action member so that a lateral displacement is provided. The lateral displacement corresponds to magnitude of the torque and opposite to the direction of the torque.

According to still another embodiment of the present invention, the steering control mechanism is a steering wheel, and the control unit generates an electrical signal by turning the steering wheel so that the reciprocating action member of the linear slide mechanism is driven to produce a lateral displacement. The interlocking rods of the two longitudinal interlocking mechanisms are driven simultaneously by the lateral displacement, and two wheels of the vehicles have an opposite longitudinal displacement so as to provide the vehicle with an inclination angle.

Therefore, the rider turns the steering wheel to control the vehicle and the present invention uses the control unit to send an electrical signal to drive the reciprocating action member to provide lateral displacement in real time. Thus, the two longitudinal interlocking mechanisms are driven simultaneously and with accuracy so that two wheels of the vehicles connected to the longitudinal interlocking mechanism have two longitudinal displacements with opposite directions and the same magnitude to provide the vehicle with an inclination change and enhance the inclination force.

According to one embodiment of the present invention, the method for using the variable inclination mechanism includes the steps: applying a torque at the steering control mechanism and generating an electrical signal received by the control unit; sending an electrical signal to the linear slide mechanism by the control unit; driving the reciprocating action member to provide a lateral displacement corresponding to magnitude of torque and opposite to the direction of the torque; driving the two longitudinal interlocking mechanism and the interlocking rods simultaneously; providing opposite longitudinal displacements with the two longitudinal interlocking mechanisms; driving the wheels to provide an inclination angle corresponding to the torque.

Thus, according to the present invention, a torque is applied to the steering control mechanism, and an electrical signal is sent to the linear slide mechanism by the control unit so as to drive and control the lateral displacement of the reciprocating action member. The lateral displacement is used to drive the interlocking rods of the two longitudinal interlocking mechanisms simultaneously to drive two wheels and provide inclination angle corresponding to the torque. Thus, it is easy to change the inclination angle.

According to one embodiment of the present invention, an active vehicle with inclination adjustment mechanism is provided to adjust inclination of vehicle. The vehicle may have three wheels or more. The inclination adjustment mechanism includes a linear slide mechanism, two longitudinal interlocking mechanisms, a steering control mechanism, a control unit, and a velocity adjustment mechanism. The linear slide mechanism includes a reciprocating action member and is controlled by the control unit to provide a lateral displacement. Each of the two longitudinal interlocking mechanisms has a plurality of interlocking rods, and two ends of each of the two longitudinal interlocking mechanisms are connected to one end of the reciprocating action member and one wheel respectively. The steering control mechanism is turned so that the control unit generates an electrical signal to control the reciprocating action member and to provide a lateral displacement. The lateral displacement is used to drive the interlocking rods of the two longitudinal interlocking mechanisms simultaneously to drive two wheels and provide opposite longitudinal displacement, and, therefore, the two wheels have an inclination angle. Besides, the velocity adjustment mechanism is electrically connected to the control unit and is used to increase vehicle velocity and make the control unit to generate an electrical signal to control the reciprocating action member and provide additional lateral displacement. Alternately, the velocity adjustment mechanism is also used to decrease the vehicle velocity and make the control unit to generate an electrical signal to control the reciprocating action member and decrease additional lateral displacement.

According to another embodiment of the present invention, while the steering control mechanism is subjected to a torque, the velocity adjustment mechanism adjusts speed and an electrical signal is generated by the control unit to control the lateral displacement of the reciprocating action member.

According to the present invention, the vehicles are entering the curve or turning direction, the velocity adjustment mechanism adjusts speed and the control unit controls the lateral displacement of the reciprocating action member to provide a lateral displacement corresponding to vehicle speed. Thus, the two longitudinal interlocking mechanisms provide a proper inclination angle to enhance riding comfort and safety while the vehicles are turning direction at different speeds.

According to still another embodiment of the present invention, while the steering control mechanism is idle and the velocity adjustment mechanism adjusts vehicle to be stationary, the control unit generates an electrical signal to lock the reciprocating action member at a status to make vehicle balanced and self-supported.

Thus, according to the present invention, the vehicle is idle and the steering control mechanism is not subjected to a torque, the control unit is used to lock the reciprocating action member at a status to make vehicle balanced so that the vehicle has no inclination and the vehicle is self-supported.

According to one embodiment of the present invention, the method for using the variable inclination mechanism includes the steps: applying a torque on the steering control mechanism; sending an electrical signal to the linear slide mechanism by the control unit; driving the reciprocating action member to provide a lateral displacement corresponding to magnitude of torque and opposite to the direction of the torque; driving the two longitudinal interlocking mechanism simultaneously to provide two opposite longitudinal displacements; driving the two wheels to provide an inclination angle corresponding to the torque; controlling the control unit to change speed of the vehicle; sending another electrical signal by the control unit to drive the linear slide mechanism; driving the reciprocating action member to provide increase/decrease amount of the lateral displacement corresponding to speed of change; providing opposite additional longitudinal displacements with the two longitudinal interlocking mechanism; driving the two wheels and adjusting inclination angle corresponding to speed of change; making the vehicle to be stationary by the velocity adjustment mechanism and making the steering control mechanism idle; locking the reciprocating action member at a status to make vehicle balanced by the control unit so that the vehicle is self-supported.

In summary, according to the present invention, while the vehicle is entering curve or turning direction, an additional lateral displacement is provided by accelerating or decelerating the reciprocating action member, and wheels have additional longitudinal displacement to change the inclination angle and the inclination force. In addition, while the vehicle is stationary and the steering control mechanism is idle, the reciprocating action member is locked so that the vehicle has no inclination to make the vehicle self-supported.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
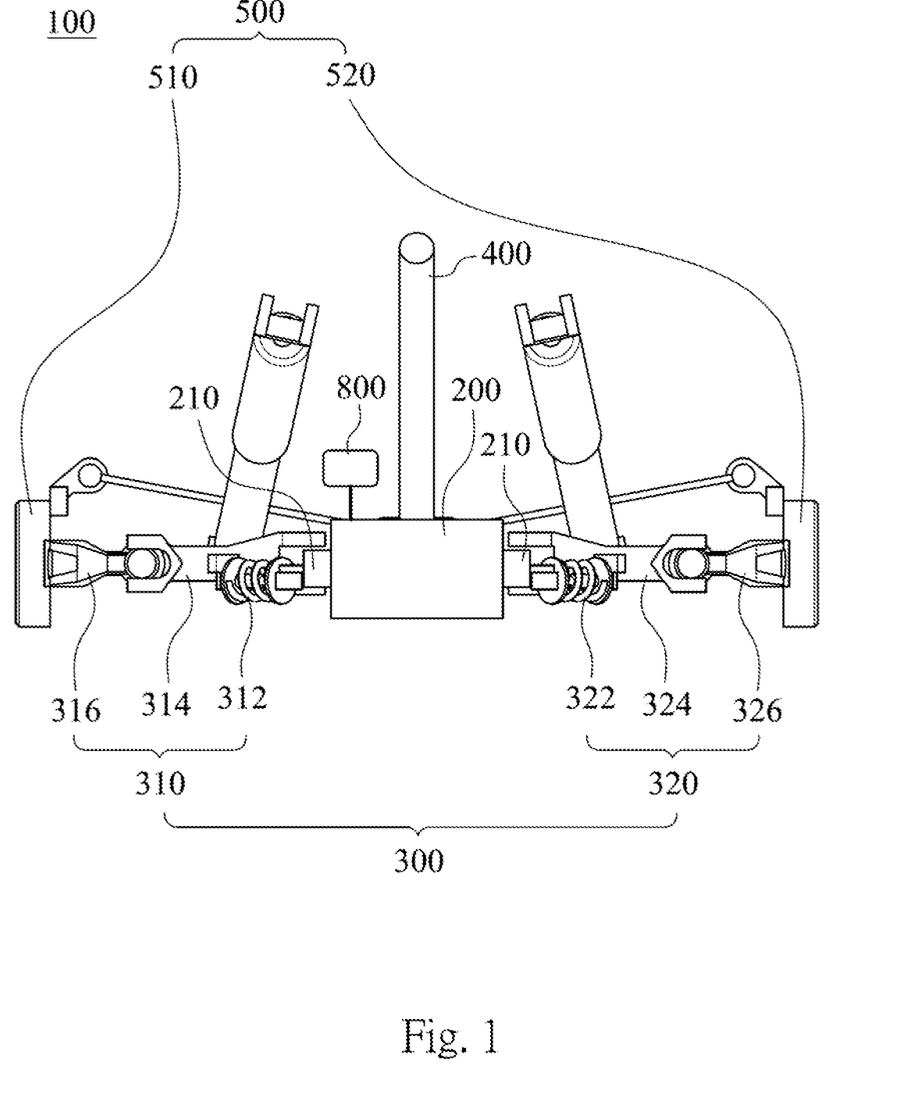
FIG. 1 is a perspective view of an active vehicle with variable inclination mechanism according to one embodiment of the present invention.

Please refer to FIG. 1. FIG. 1 is a perspective view of an active vehicle with variable inclination mechanism according to one embodiment of the present invention. The aforementioned figure should fully illustrate detailed structure of the present invention. According to one embodiment of the present invention, the active vehicle with variable inclination mechanism 100 includes a linear slide mechanism 200, a reciprocating action member 210, two longitudinal interlocking mechanism 300, a steering control mechanism 400, a control unit 800, and two wheels 500. Detailed structure is explained in the following.

According to one embodiment of the present invention, the active vehicle with variable inclination mechanism 100 turns the steering control mechanism 400 to provide the vehicle (not shown) with inclination angle for entering curve. The embodiment is based on a three-wheeled vehicle with two parallel front wheels 500.

The variable inclination mechanism 100 of the present invention may be installed between two parallel front wheels 500 of a three-wheeled vehicle. The variable inclination mechanism 100 includes a linear slide mechanism 200, and the linear slide mechanism 200 includes a reciprocating action member 210. An electrical signal is generated by the control unit 800 that is connected to the steering control mechanism 400 to control the reciprocating action member 210 so that a lateral displacement is provided between the two parallel front wheels 500. The longitudinal interlocking mechanism 300 includes a left-sided longitudinal interlocking mechanism 310 and right-sided longitudinal interlocking mechanism 320 that are symmetrically connected to both ends of the reciprocating action member 210. Each of the two longitudinal interlocking mechanisms 300 includes a plurality of interlocking rods (not shown) that are connected to the reciprocating action member 210.

Out of the interlocking rods, the right end of the left-sided first interlocking rod 312 is connected to the left end of the reciprocating action member 210. The left end of the left-sided first interlocking rod 312 is connected to the right end of the left-sided second interlocking rod 314. The left end of the left-sided second interlocking rod 314 is connected to the right end of the left-sided third interlocking rod 316. The left end of the left-sided third interlocking rod 316 is connected to a left-sided wheel 510. The left end of the right-sided first interlocking rod 322 is connected to the right end of the reciprocating action member 210. The right end of the right-sided first interlocking rod 322 is connected to the left end of the right-sided second interlocking rod 324. The right end of the right-sided second interlocking rod 324 is connected to the left end of the right-sided third interlocking rod 326. The right end of the right-sided third interlocking rod 326 is connected to a right-sided wheel 520.

By turning the steering control mechanism 400, the control unit 800 generates an electrical signal to control the reciprocating action member 210 of the linear slide mechanism 200 to provide a lateral displacement. By the lateral displacement, a plurality interlocking rods of the longitudinal interlocking mechanisms 300 are driven so that the two wheels 500 have longitudinal displacements with opposite direction to the lateral displacement and have inclination angle.

Figure 2:
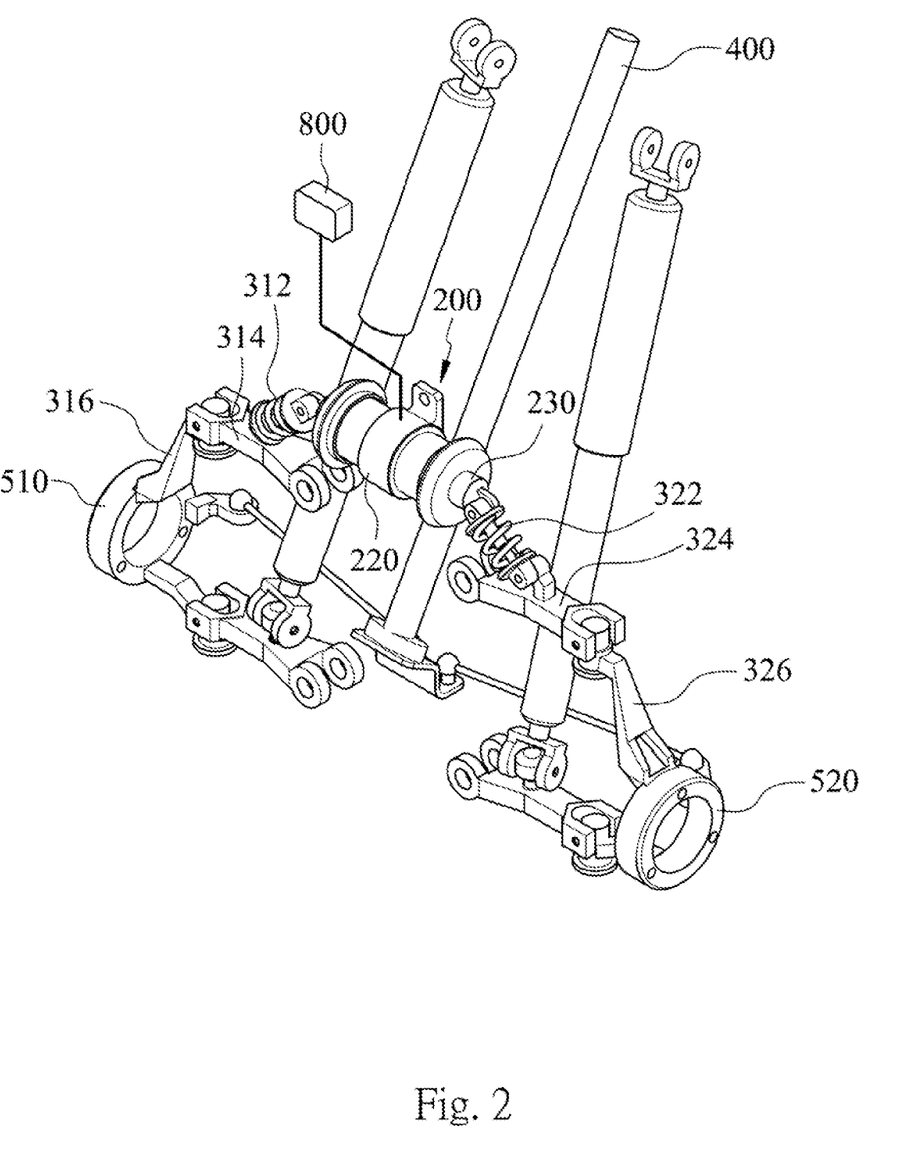
FIG. 2 is another perspective view of an active vehicle with variable inclination mechanism according to one embodiment of the present invention.
Figure 2A:
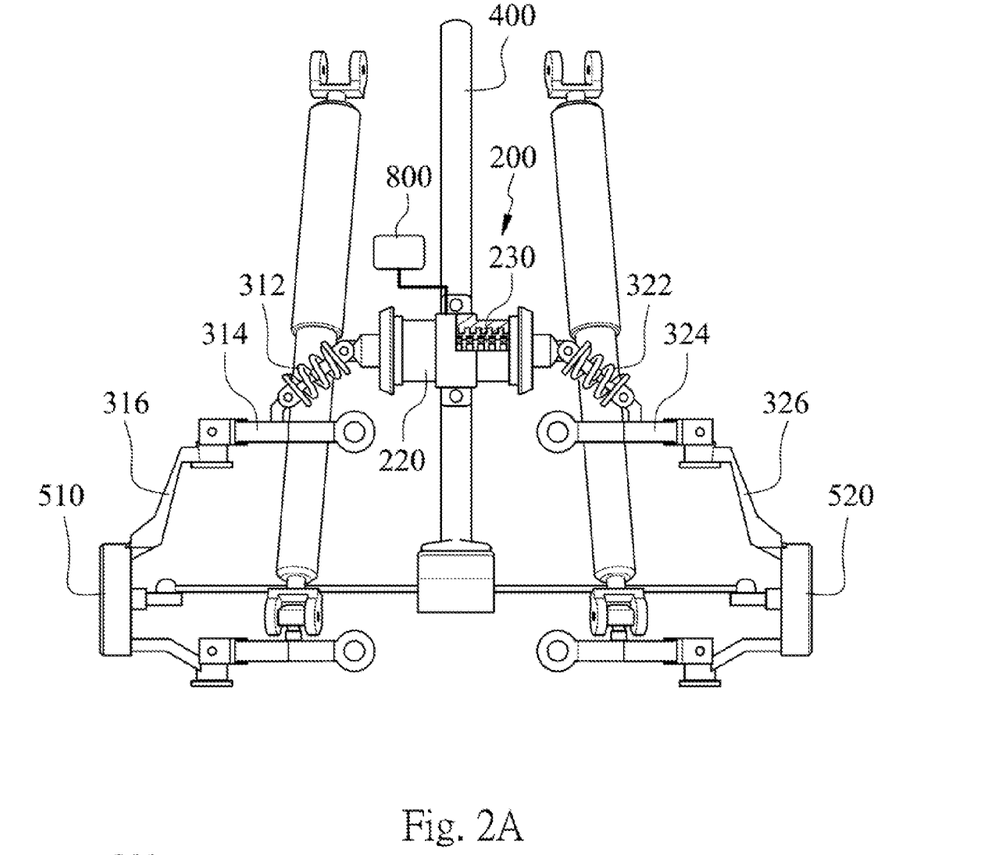
FIG. 2A is a front view of an active vehicle with variable inclination mechanism of FIG. 2.
Figure 2B:
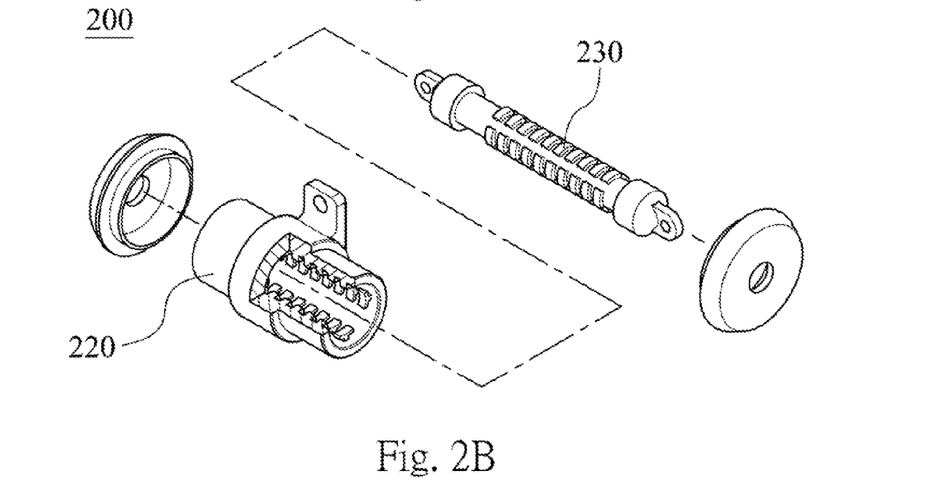
FIG. 2B is an exploded view of a linear motor of an active vehicle with variable inclination mechanism of FIG. 2.

Please refer to FIGS. 2, 2A, and 2A. FIG. 2 is another perspective view of an active vehicle with variable inclination mechanism according to one embodiment of the present invention. The linear slide mechanism 200 may be a linear motor 220, and the reciprocating action member 210 may be a rotator 230 of the linear motor 220. The linear motor 220 drives the rotator 230 so that the rotator 230 has the lateral displacement. Connection and operation among the linear motor 220, the rotator 230, the steering control mechanism 400, the control unit 800, the longitudinal interlocking mechanisms 300, and wheels 500 are described in the aforementioned embodiments so description will be omitted.

Figure 3:
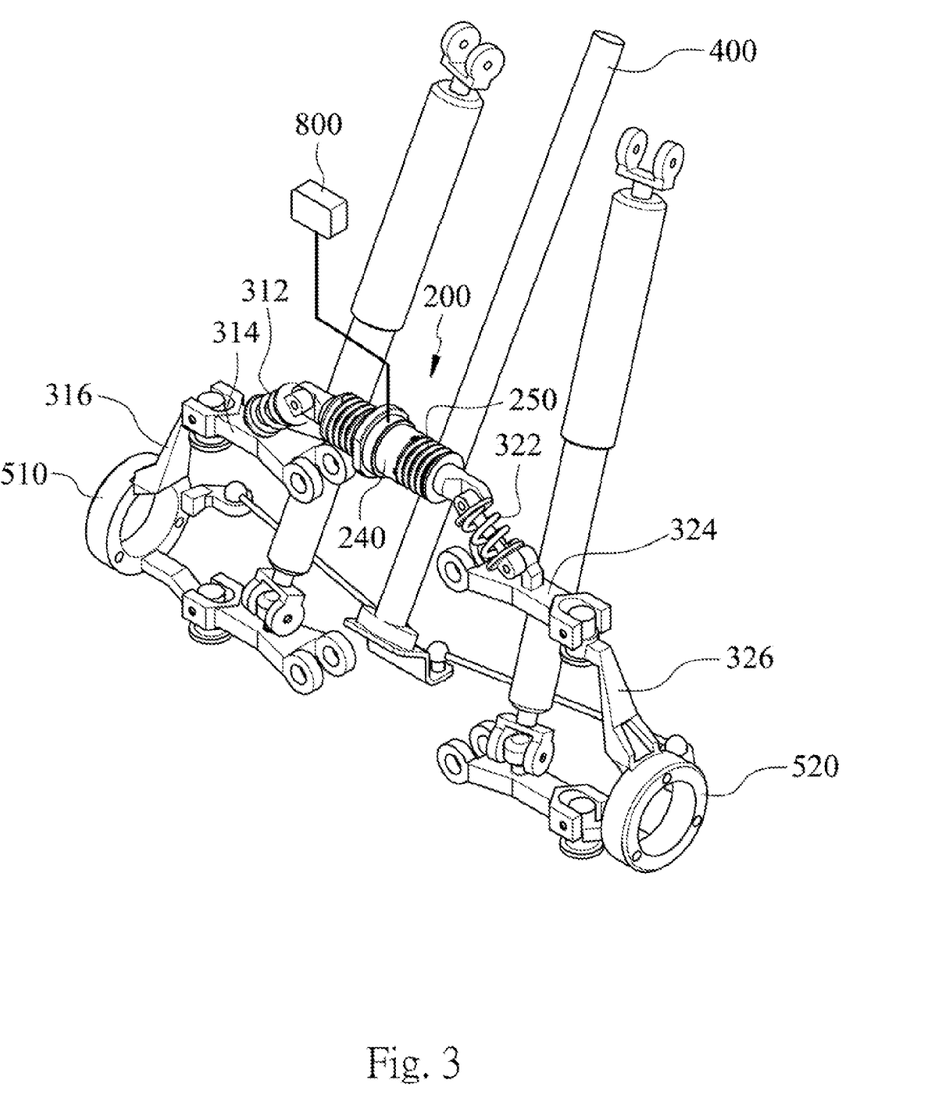
FIG. 3 is a perspective view of an active vehicle with variable inclination mechanism according to another embodiment of the present invention.
Figure 3A:
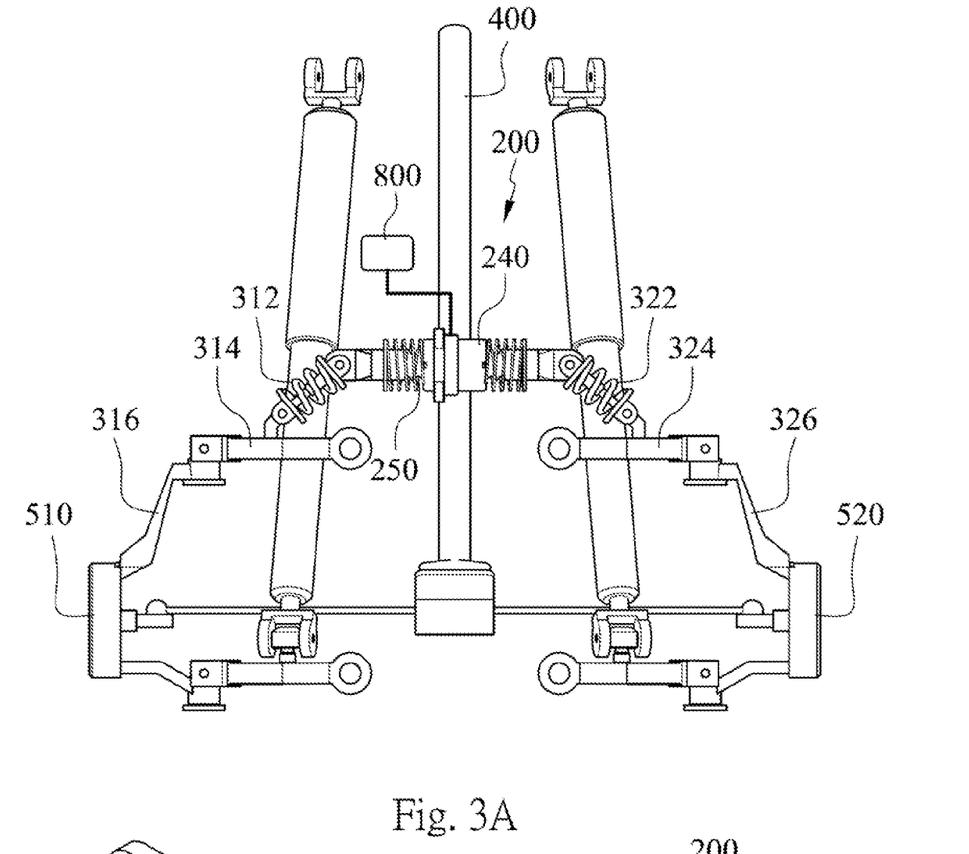
FIG. 3A is a front view of an active vehicle with variable inclination mechanism of FIG. 3.
Figure 3B:
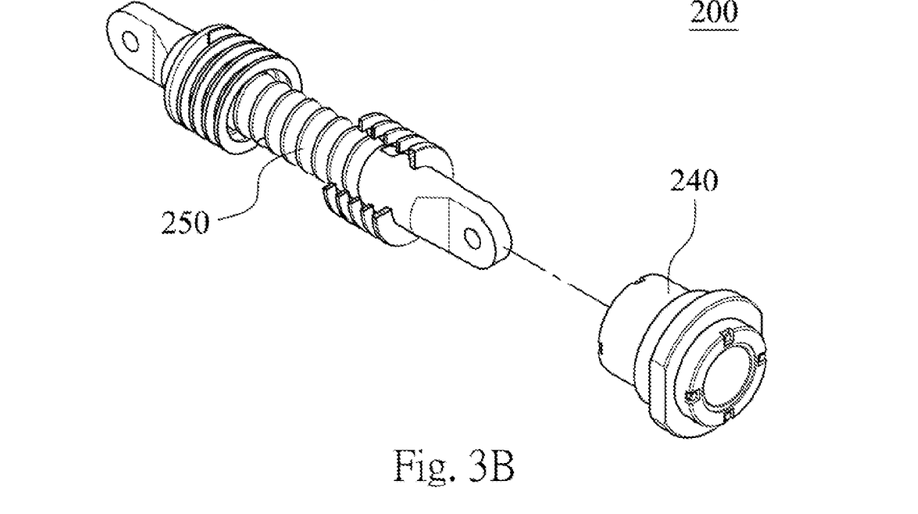
FIG. 3B is an exploded view of a motor and a ball screws of an active vehicle with variable inclination mechanism of FIG. 3.

Please refer to FIGS. 3, 3A, and 3A. FIG. 3 is a perspective view of an active vehicle with variable inclination mechanism according to another embodiment of the present invention. The linear slide mechanism 200 may be a motor 240, and the reciprocating action member 210 may be a ball screw 250. The motor 240 rotates clockwise and counterclockwise to drive the ball screw 250 to move forward/backward so that the ball screw 250 has a reciprocating movement. Connection and operation among the motor 240, the ball screw 250, the steering control mechanism 400, the control unit 800, the longitudinal interlocking mechanism 300, and wheels 500 are described in the aforementioned embodiments so description will be omitted.

Figure 4:
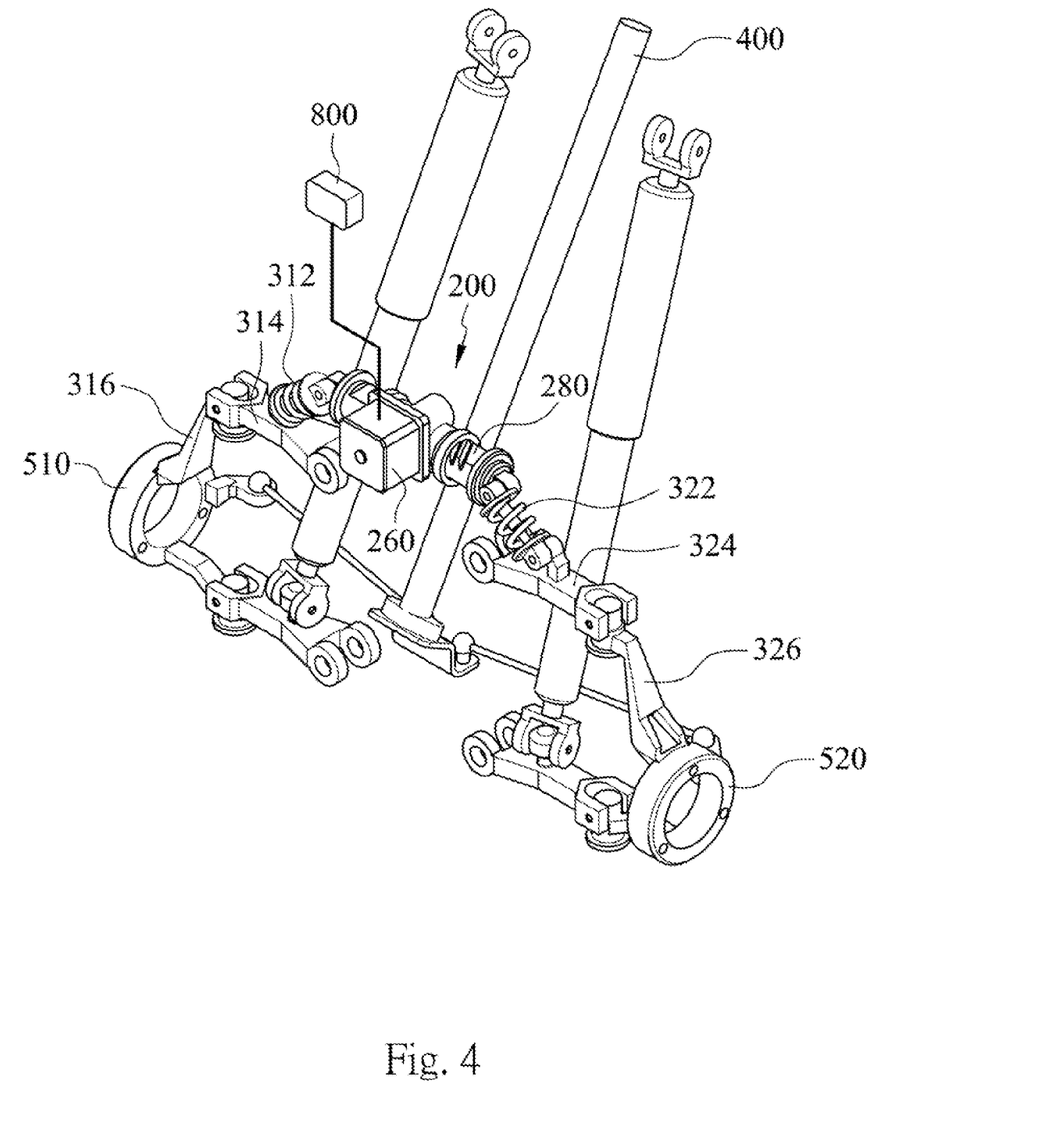
FIG. 4 is a perspective view of an active vehicle with variable inclination mechanism according to one more embodiment of the present invention.
Figure 4A:
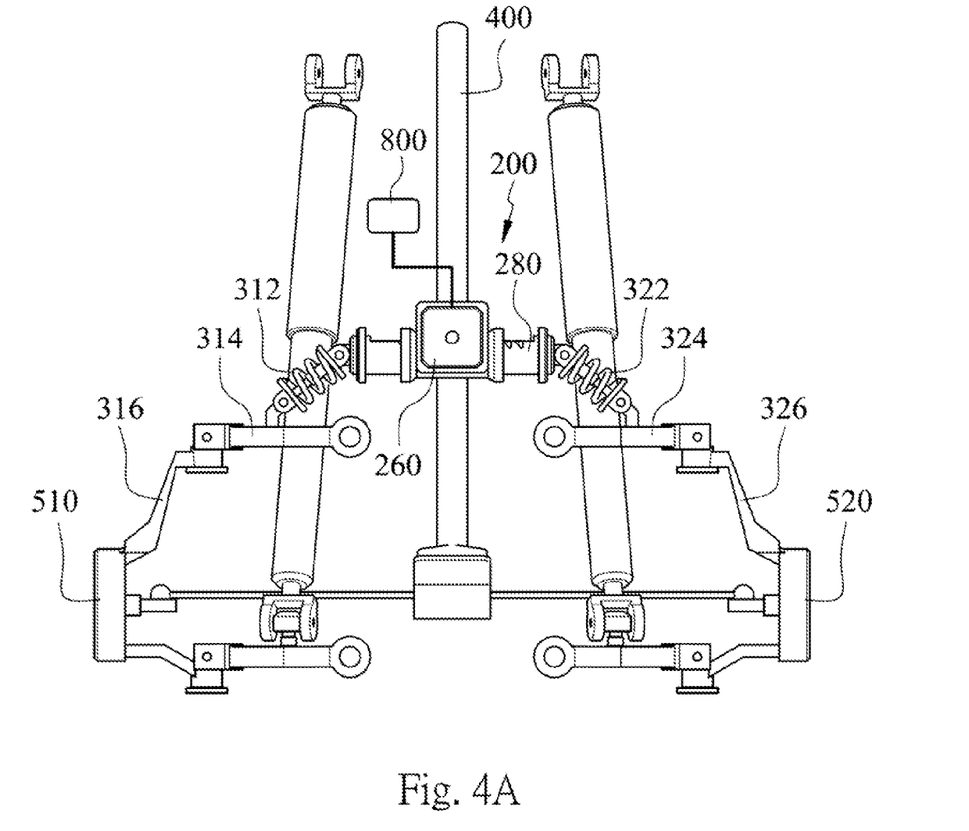
FIG. 4A is a front view of an active vehicle with variable inclination mechanism of FIG. 4.
Figure 4B:
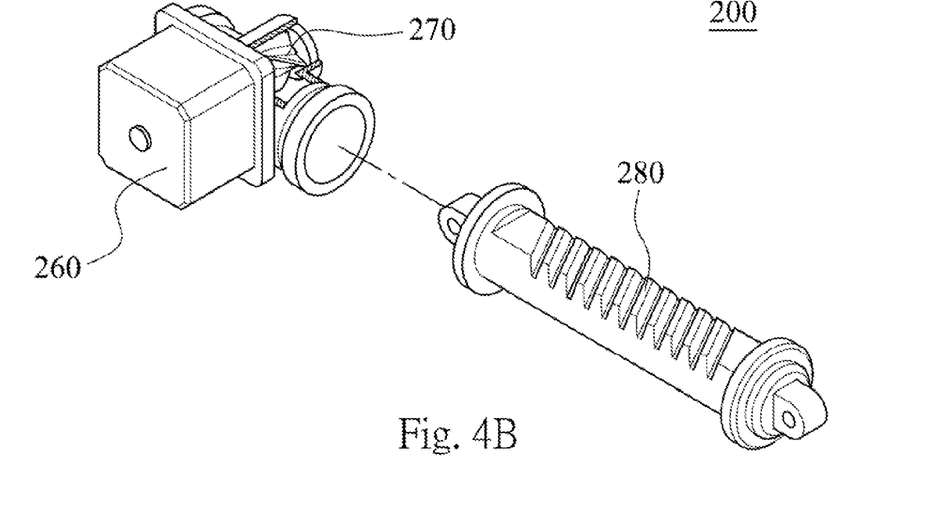
FIG. 4B is an exploded view of a motor, a pinion gear and a rack gear of an active vehicle with variable inclination mechanism of FIG. 4.

Please refer to FIGS. 4, 4A, and 4B. FIG. 4 is a perspective view of an active vehicle with variable inclination mechanism according to one more embodiment of the present invention. The linear slide mechanism 200 includes a motor 260 and a pinion gear 270. The reciprocating action member 210 may be a gear rack 280. The motor 260 drive the pinion gear 270 to rotate clockwise and counterclockwise so that the gear rack 280 has a reciprocating lateral movement. Connection and operation among the motor 260, the pinion gear 270, the gear rack 280, the steering control mechanism 400, the control unit 800, the longitudinal interlocking mechanism 300, and wheels 500 are described in the aforementioned embodiments so description will be omitted.

Figure 5:
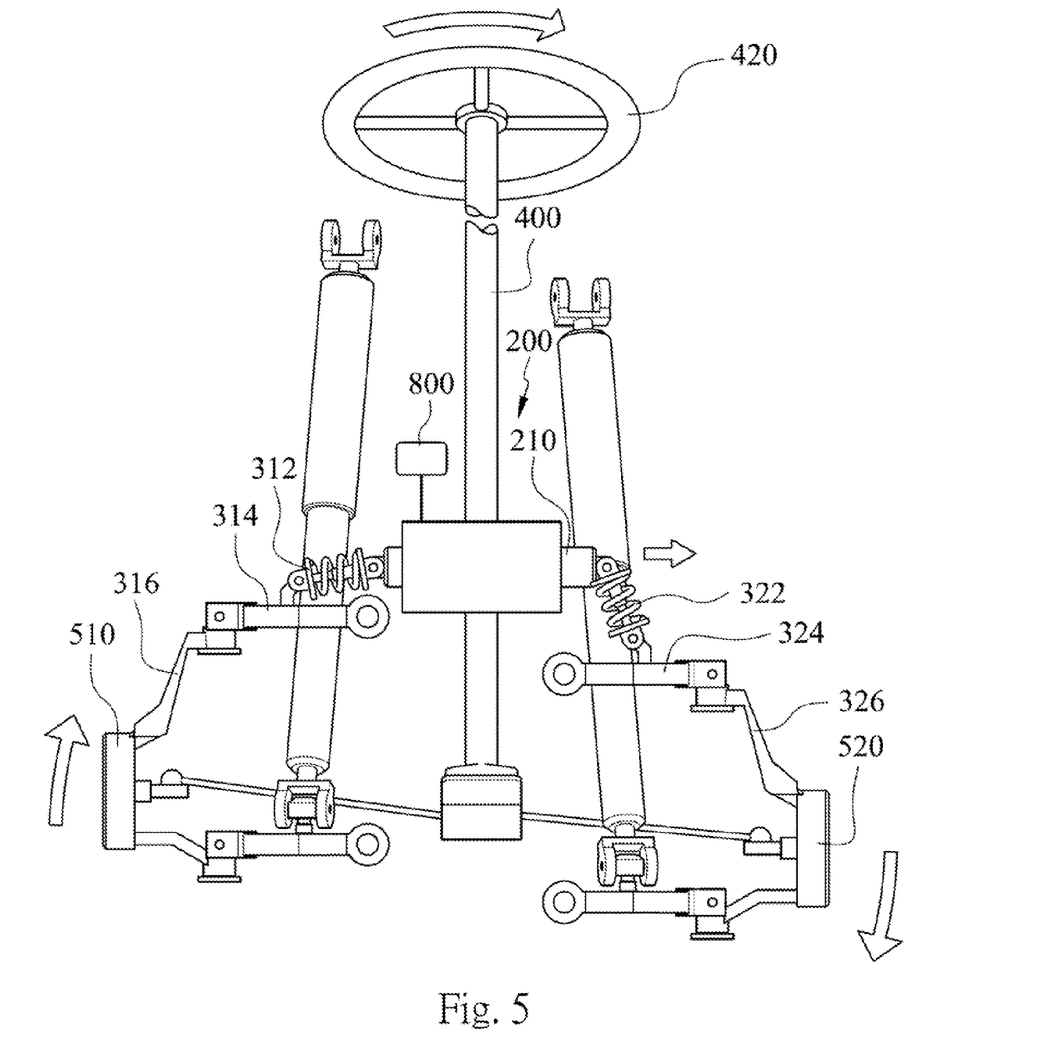
FIG. 5 is a perspective view of an active vehicle with variable inclination mechanism according to one embodiment of the present invention.

Please refer to FIG. 5. FIG. 5 is a perspective view of an active vehicle with variable inclination mechanism according to one embodiment of the present invention. The steering control mechanism 400 may be a steering wheel 420. While the steering wheel 420 is subjected to a torque and turned left, the control unit 800 sends an electrical signal to drive the reciprocating action member 210 of the linear slide mechanism 200 and provide a lateral displacement corresponding to the torque and in an opposite direction. Thus, the vehicle has an inclination force toward the left side. Connection and operation among the steering wheel 420, the reciprocating action member 210, the control unit 800, the longitudinal interlocking mechanism 300, and the wheels 500 are described in the aforementioned embodiments so description will be omitted.

Therefore, according to the present invention, a torque is applied to the steering wheel 420, and the reciprocating action member 210 is controlled by the control unit 800 to provide a lateral displacement corresponding to magnitude and direction of the torque. The linear slide mechanism 200 may consist of the linear motor 220 and the rotator 230, the motor 240 and the ball screw 250, or the motor 260, the pinion gear 270, and the gear rack 280 so as to provide real time and accurate lateral displacement corresponding to the torque. The lateral displacement is used to drive the interlocking rods of both the left-sided longitudinal interlocking mechanism 310 and the right-sided longitudinal interlocking mechanism 320 so as to drive the left-sided wheel 510 and the right-sided wheel 510 to provide a longitudinal displacement in a direction opposite to the lateral displacement and corresponding to inclination angle change and inclination of the vehicle. Thus, the vehicle is subjected to an inclination force.

Figure 6:
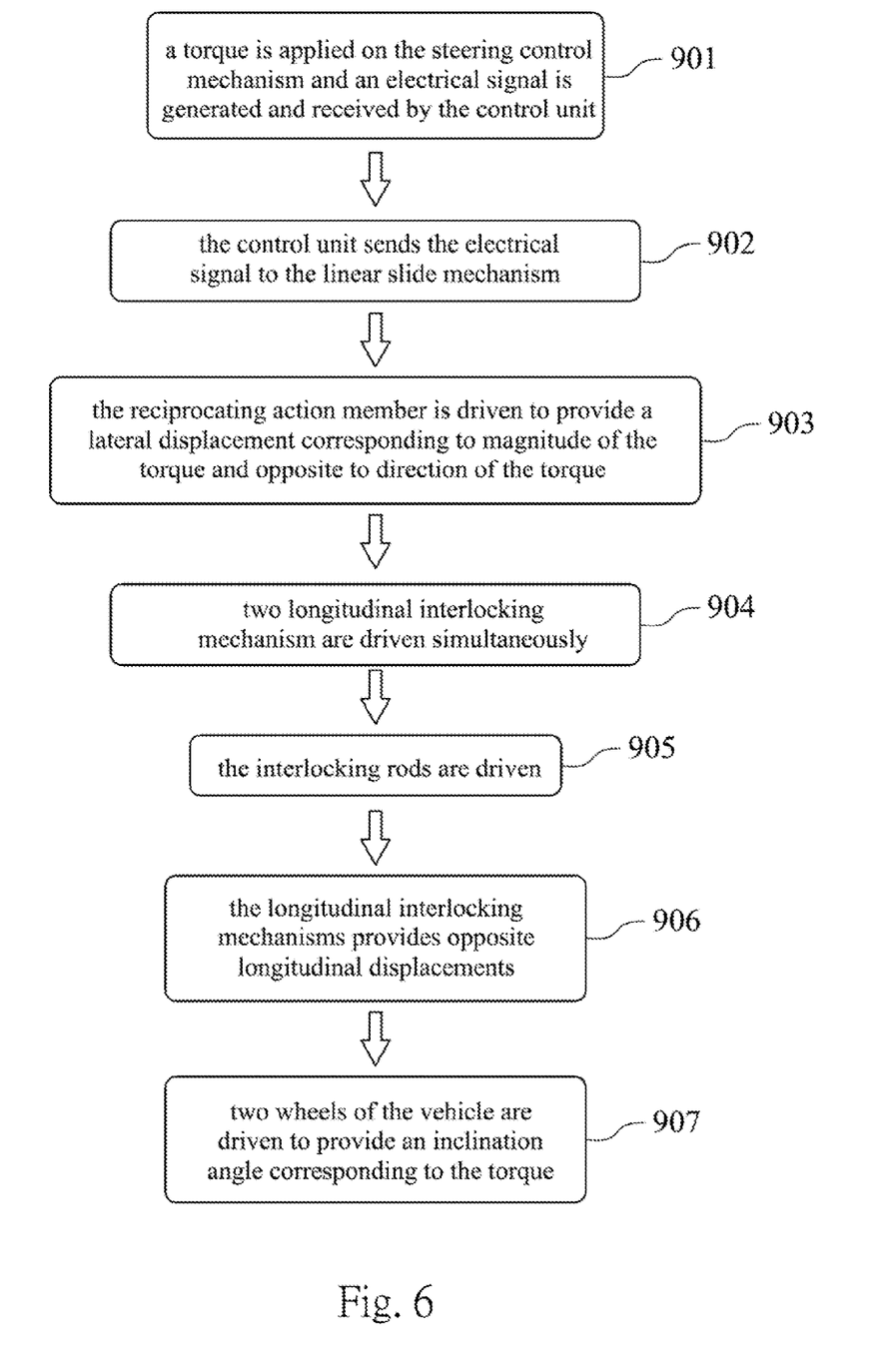
FIG. 6 is a flowchart of a method for using the variable inclination mechanism according to one embodiment of the present invention.

Please refer to FIG. 6. FIG. 6 is a flowchart of a method for using the variable inclination mechanism according to one embodiment of the present invention. The method includes the steps: at Step 901, a torque is applied on the steering control mechanism 400 and an electrical signal is generated and received by the control unit 800; at step 902, the control unit 800 sends the electrical signal to the linear slide mechanism 200; at step 903, the reciprocating action member 210 is driven to provide a lateral displacement corresponding to magnitude of the torque and opposite to direction of the torque; at step 904, two longitudinal interlocking mechanism 300 are driven simultaneously; at step 905, the interlocking rods are driven; at step 906, the longitudinal interlocking mechanisms 300 provides opposite longitudinal displacements; at step 907, two wheels 500 of the vehicle are driven to provide an inclination angle corresponding to the torque.

Figure 7:
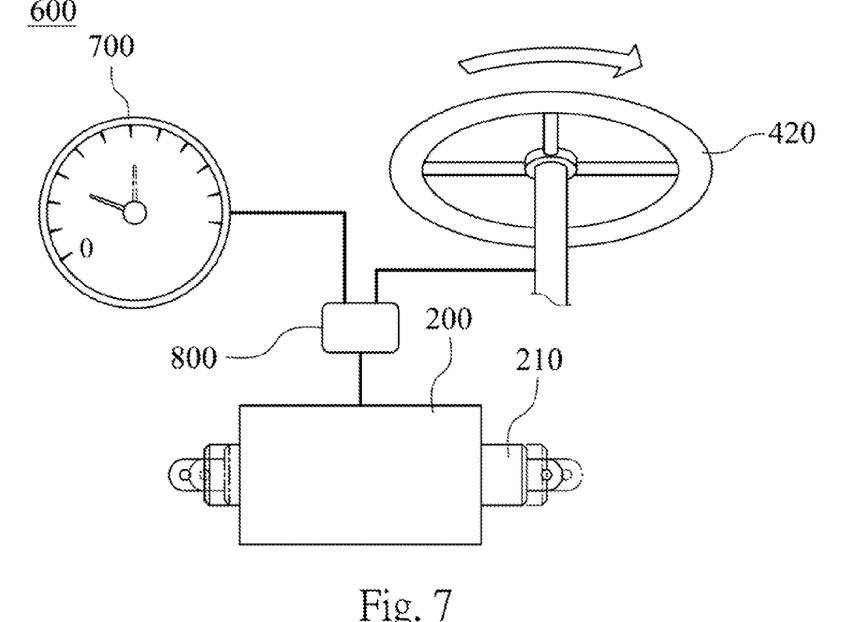
FIG. 7 is a schematic of how the reciprocating action member reacts while the vehicle speed is changed according to one embodiment of the present invention.

Please refer to FIGS. 5 and 7. FIG. 5 is a perspective view of an active vehicle with variable inclination mechanism according to one embodiment of the present invention. FIG. 7 is a schematic of how the reciprocating action member reacts while the vehicle speed is changed according to one embodiment of the present invention. According to the present invention, a vehicle inclination adjustment mechanism 600 is provided to adjust an inclination angle of the vehicle. The vehicle may have three wheels 500 or more. The vehicle inclination adjustment mechanism 600 includes a linear slide mechanism 200, two longitudinal interlocking mechanisms 300, a steering control mechanism 400, a control unit 800, and a velocity adjustment mechanism 700. The linear slide mechanism 200 includes a reciprocating action member 210 that is used to provide a lateral displacement. Each of the longitudinal interlocking mechanisms 300 includes a plurality of interlocking rods (not shown), and two ends of each of the longitudinal interlocking mechanisms 300 are connected to one end of the reciprocating action member 210 and one wheels 500 respectively. An electrical signal is generated by the control unit 800 that is connected to the steering control mechanism 400 to control the reciprocating action member 210 so as to provide a lateral displacement between the two parallel front wheels 500. By the lateral displacement, the longitudinal interlocking mechanisms 300 are driven at the same time to drive the two wheels 500 to provide longitudinal displacements with opposite direction so that an inclination angle is provided.

While the steering control mechanism 400 is subjected to a torque and turned left, the velocity adjustment mechanism 700 adjusts the lateral displacement of the reciprocating action member 210 by the control unit 800. Besides, the longitudinal displacement of longitudinal interlocking mechanisms 300 is adjusted so as to adjust the inclination angle of the vehicle. The velocity adjustment mechanism 700 increases vehicle speed to have the control unit 800 send an electrical signal to drive the reciprocating action member 210 to provide the lateral displacement with additional increase amount toward right side. Besides, the velocity adjustment mechanism 700 decreases vehicle speed to have the control unit 800 send an electrical signal to drive the reciprocating action member 210 to provide the lateral displacement with additional increase amount toward left side.

Therefore, according to the present invention, while the vehicle is entering the curve, the velocity adjustment mechanism 700 uses the control unit 800 to send an electrical signal to adjust the lateral displacement of the reciprocating action member 210. The left-sided longitudinal interlocking mechanism 310 and the right-sided longitudinal interlocking mechanism 320 provide longitudinal displacements corresponding to magnitude of torque and opposite to the direction of the torque simultaneously so that the left-sided wheel 510 and the right-sided wheel 510 provide corresponding inclination angle. Thus, it enhances riding comfort and safety while the vehicles are entering curves at different speeds.

Figure 8:
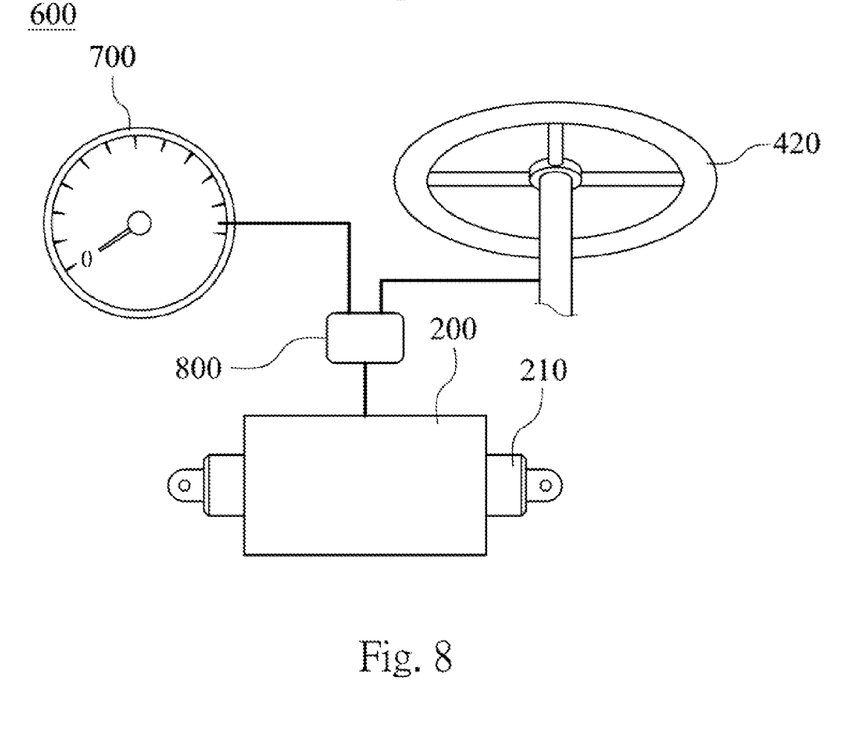
FIG. 8 is a schematic of a method for using the variable inclination mechanism according to one embodiment of the present invention.

Please refer to FIG. 8. FIG. 8 is a schematic of a method for using the variable inclination mechanism according to one embodiment of the present invention. A steering control mechanism of the vehicle inclination adjustment mechanism 600 may be a steering wheel 420. While the steering wheel 420 is not subjected to a torque yet and the velocity adjustment mechanism 700 controls the vehicle to be stationary, the control unit 800 controls the linear slide mechanism 200 to make the reciprocating action member 210 lock the vehicle at a status to make vehicle balanced and to lock a position of the longitudinal interlocking mechanism 300. Thus, the vehicle is self-supported.

Therefore, according to the present invention, while the vehicle is stationary and the steering control mechanism 400 is not activated yet, the control unit 800 is used to control the reciprocating action member 210 to lock the vehicle at a status to make vehicle balanced. That is, the vehicle is maintained upright so the vehicle is self-supported.

Figure 9:
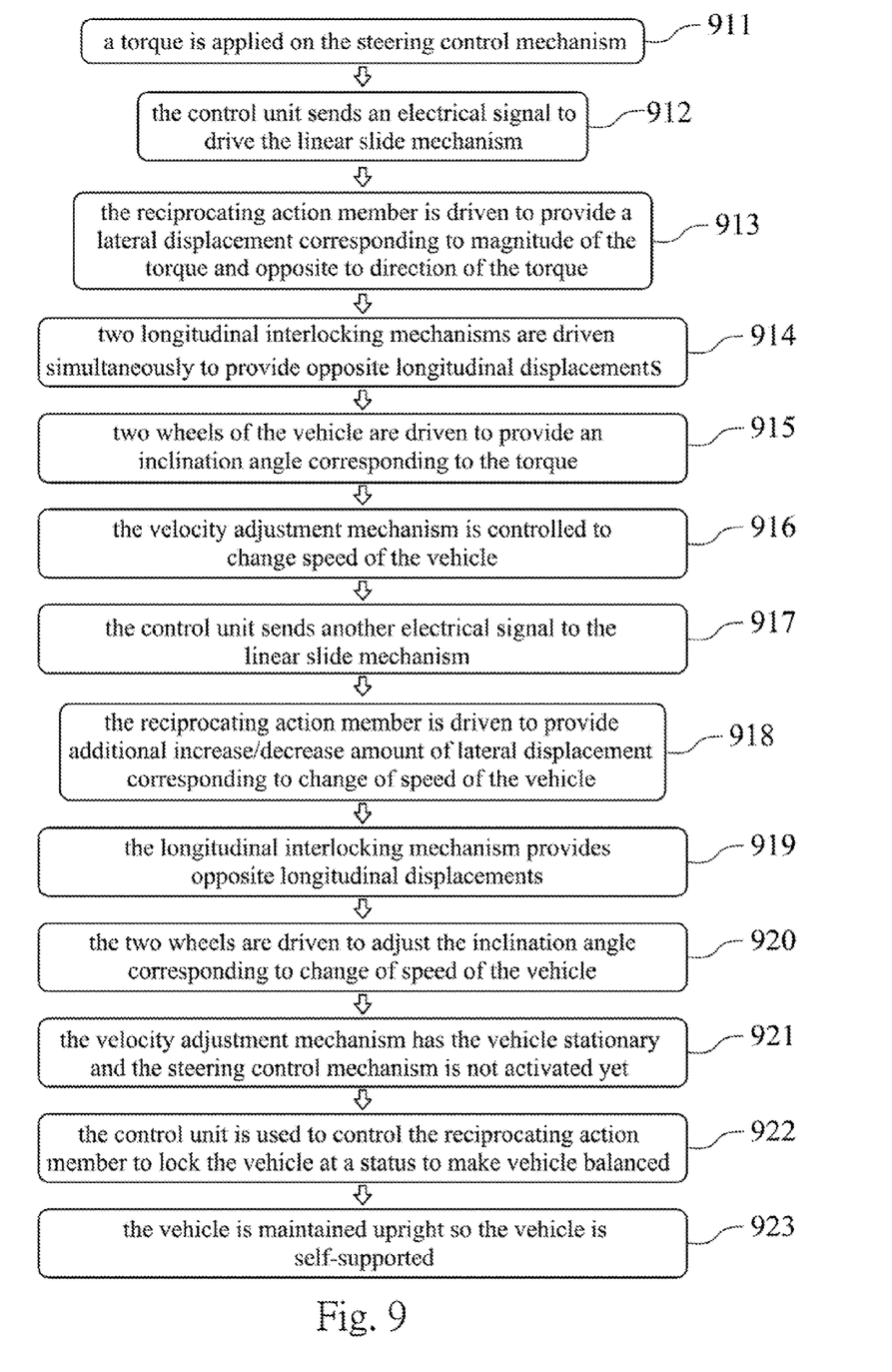
FIG. 9 is a flowchart of a method for using the variable inclination mechanism according to one embodiment of the present invention.

Please refer to FIG. 9. FIG. 9 is a flowchart of a method for using the variable inclination mechanism according to one embodiment of the present invention. The method includes the steps: at Step 911, a torque is applied on the steering control mechanism 400; at step 912, the control unit 800 sends an electrical signal to drive the linear slide mechanism 200; at step 913, the reciprocating action member 210 is driven to provide a lateral displacement corresponding to magnitude of the torque and opposite to direction of the torque; at step 914, two longitudinal interlocking mechanisms 300 are driven simultaneously to provide opposite longitudinal displacements; at step 915, two wheels 500 of the vehicle are driven to provide an inclination angle corresponding to the torque; at step 916, the velocity adjustment mechanism 700 is controlled to change speed of the vehicle; at step 917, the control unit 800 sends another electrical signal to the linear slide mechanism 200; at step 918, the reciprocating action member 210 is driven to provide additional increase/decrease amount of lateral displacement corresponding to change of speed of the vehicle; at step 919, the longitudinal interlocking mechanism 300 provides opposite longitudinal displacements; at step 920, the two wheels 500 are driven to adjust the inclination angle corresponding to change of speed of the vehicle; at step 921, the velocity adjustment mechanism 700 has the vehicle stationary and the steering control mechanism 400 is not activated yet; at step 922, the control unit 800 is used to control the reciprocating action member 210 to lock the vehicle at a status to make vehicle balanced; step 923, the vehicle is maintained upright so the vehicle is self-supported.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active vehicle with variable inclination mechanism, comprising:
    a linear slide mechanism, having a reciprocating action member that is driven to produce a lateral movement;
    two longitudinal interlocking mechanisms, each of the longitudinal interlocking mechanisms having a plurality of interlocking rods and having two ends, and two ends of each of the longitudinal interlocking mechanisms connected to one end of the reciprocating action member and one of two wheels respectively;
    a steering control mechanism, used to control the reciprocating action member to provide a lateral displacement that drives the longitudinal interlocking mechanisms so that the two wheels are provided with opposite longitudinal displacements; and
    a control unit, controlled by the steering control mechanism and generating an electrical signal to drive the linear slide mechanism.

2. A variable inclination mechanism of claim 1, wherein the linear slide mechanism is a linear motor, and the reciprocating action member is a mover of the linear motor.

3. A variable inclination mechanism of claim 1, wherein the linear slide mechanism comprises a motor and a ball nut, and the reciprocating action member is a ball screw.

4. A variable inclination mechanism of claim 1, wherein the linear slide mechanism comprises a motor and a pinion gear, and the reciprocating action member comprises a rack gear.

5. A variable inclination mechanism of claim 1, wherein while a torque is applied to the steering control mechanism, the control unit generates an electrical signal to the linear slide mechanism and controls the reciprocating action member so that a lateral displacement is provided and the lateral displacement corresponds to magnitude of the torque and is opposite to the direction of the torque.

6. A variable inclination mechanism of claim 1, wherein the steering control mechanism is a steering wheel.

7. A method for using the variable inclination mechanism of claim 1, the method comprises the steps:
    applying a torque on the steering control mechanism and generating an electrical signal received by the control unit;
    sending the electrical signal to the linear slide mechanism by the control unit; and
    driving the reciprocating action member to provide a lateral displacement, wherein the reciprocating action member drives the two longitudinal interlocking mechanism simultaneously and provides opposite longitudinal displacement, and the opposite longitudinal displacement drives two wheels to provide an inclination angle corresponding to the torque.

8. A vehicle inclination adjustment mechanism, comprising:
    a linear slide mechanism, having a reciprocating action member and driven to produce a lateral movement;
    two longitudinal interlocking mechanisms, each of the longitudinal interlocking mechanisms having a plurality of interlocking rods and having two ends, and two ends of each of the longitudinal interlocking mechanisms connected to one end of the reciprocating action member and one of two wheels respectively;
    a steering control mechanism, used to control the reciprocating action member to provide a lateral displacement that drives the longitudinal interlocking mechanisms so that the two wheels is provided with an opposite longitudinal displacement;
    a velocity adjustment mechanism, providing the lateral displacement with additional increase amount while a vehicle speed is increased, and providing the lateral displacement with additional decrease amount while the vehicle speed is decreased; and
    a control unit, controlled by the steering control mechanism and the velocity adjustment mechanism and generating an electrical signal to drive the linear slide mechanism.

9. A vehicle inclination adjustment mechanism of claim 8, wherein while the steering control mechanism is subjected to a torque, the velocity adjustment mechanism changes the vehicle speed so that the control unit controls the lateral displacement of the reciprocating action member.

10. A vehicle inclination adjustment mechanism of claim 8, wherein while the steering control mechanism is not activated yet and the velocity adjustment mechanism makes the vehicle stationary, the control unit sends an electrical signal to lock the reciprocating action member at a status to make the vehicle balanced and self-supported.

11. A method for using the vehicle inclination adjustment mechanism of claim 8, the method comprises the steps:
    applying a torque on the steering control mechanism;
    controlling the control unit to generate an electrical signal;
    driving the reciprocating action member to provide a lateral displacement, wherein the two longitudinal interlocking mechanisms are driven simultaneously by the lateral displacement to provide opposite longitudinal displacement, and the two wheels are moved by the opposite longitudinal displacement to provide an inclination angle corresponding to the torque;
controlling the velocity adjustment mechanism to adjust the vehicle speed;
controlling the control unit to generate an electrical signal;
driving the reciprocating action member to provide additional lateral displacement, wherein the additional lateral displacement drives the two longitudinal interlocking mechanisms simultaneously to provide an additional opposite longitudinal displacement, and the two wheels are moved by the additional longitudinal displacement to adjust the inclination, wherein when the steering control mechanism is not activated yet, the control unit is controlled by the velocity adjustment mechanism to lock the vehicle at a stationary position;
controlling the control unit to provide an electrical signal; and
locking the reciprocating action member to have the vehicle at a stationary position at a status to make the vehicle balanced and self-supported.

* * * * *